United States Patent [19]
Meurer et al.

[11] Patent Number: 6,008,447
[45] Date of Patent: Dec. 28, 1999

[54] TRANSMISSION FOR MOVING PANELS PROVIDED WITH SOLAR CELLS ON A SPACECRAFT

[75] Inventors: René Meurer, Vagen; Albert Gietl, Brannenburg; Markus Reindl, Dachau, all of Germany

[73] Assignee: DaimlerChrysler AG, München, Germany

[21] Appl. No.: 09/108,917

[22] Filed: Jul. 1, 1998

[30] Foreign Application Priority Data

Jul. 5, 1997 [DE] Germany .......................... 197 28 844

[51] Int. Cl.⁶ ................................................. H01L 25/00
[52] U.S. Cl. ......................... 136/245; 136/292; 244/173
[58] Field of Search ................................. 136/245, 292; 244/173

[56] References Cited

FOREIGN PATENT DOCUMENTS

| PS 2 021 580 | 1/1972 | Germany . |
|---|---|---|
| 27 17 426 | 11/1978 | Germany . |
| 28 18 549 | 10/1979 | Germany . |

*Primary Examiner*—Mark Chapman
*Attorney, Agent, or Firm*—McGlew and Tuttle, P.C.

[57] ABSTRACT

A transmission for folding out the solar cell panels (3 through 7) folded in an accordion-like manner on a spacecraft (1) has cable pulleys (22 through 27) at the hinges (9 through 14), around pairs of which pulleys endless cables (29 through 33) are wound. To adapt its change in length during temperature changes to the change in the length of the panels (3 through 7) and to increase its rigidity to elongation, the cable (29 through 33) is provided with a plastic sheathing (47, 48) firmly connected to same outside the area of the cable pulleys (22 through 27).

20 Claims, 2 Drawing Sheets

TRANSMISSION FOR MOVING PANELS PROVIDED WITH SOLAR CELLS ON A SPACECRAFT

FIELD OF THE INVENTION

The present invention pertains to a cable transmission for moving panels provided with solar cells, which panels are folded on a spacecraft with hinges in an accordion-like manner, with cable pulleys at each hinge, which are connected to one panel rotating in unison with it and rotatably with the adjacent one, wherein two adjacent cable pulleys each are wound around by an endless cable, which cable is connected to it rotating in unison with it.

BACKGROUND OF THE INVENTION

Such cable transmissions have been known (see, e.g., DE-PS 2 021 580). The extension arms, of which there are, in general, two and which form the solar generators of the spacecraft, are thus unfolded. To unfold the extension arms, the movement processes of the individual solar panels must be synchronized with the cable transmissions in order for, e.g., the center of gravity of each extension arm to move during unfolding along a predetermined path and for the individual parts of the extension arm to reach the unfolded position with controlled movements.

However, the exact synchronization of the movement processes of the solar panels during the unfolding of the extension arms is associated with difficulties. Thus, strong tensile forces occur during unfolding on the cable, which lead to elongation of the cable. In addition, compared with the temperature at which the transmission is mounted, the cables are exposed to temperatures of about ±100° K under the operating conditions in the space. Since the cable has a greater coefficient of thermal expansion than the panels, which are designed as, e.g., carbon fiber-reinforced plastic sandwiches, slackening of the cable occurs at high temperatures. To prevent this from happening, the pretension of the cable must be additionally increased. Thus, very strong tensile forces act at low temperatures on the cable pulleys, which may lead to a high load on the hinges and on the solar panels, and they may considerably increase the friction in the hinges.

To ensure a defined pretension of the cables despite the greatly varying operating temperatures, it has been known that tension springs may be installed in the cables. However, a new problem is thus created.

The drive for the unfolding process is formed by, e.g., driving springs between the panels, which act on the cable pulley, on the one hand, and, on the other hand, on the panel, at which the cable pulley is mounted rotatably. To prevent the panels from shooting out to the outside uncontrollably due to these driving springs during the unfolding process, but to ensure that they are folded out at a predetermined velocity, the rotary movement of the innermost hinge, i.e., of the hinge by which the so-called yoke is connected to the spacecraft, is decelerated or, if necessary, driven, in general, with, e.g., a self-locking transmission. This preset speed of rotation of the innermost hinge shall then be transmitted by the cable transmissions to the other hinges.

However, this is not possible if the cables are provided with tension springs, because the tension springs will then lead to an uncontrolled elastic withdrawal and extension of the individual panels during unfolding.

Since the panels of each extension arm are located in one plane in the unfolded end position, corresponding locking means, which snap in automatically when the end position is reached, are, in general, provided. Thus, even a premature snapping in of the locking means may occur between two panels due to the uncontrolled extension based on the tension springs in the cables of the cable transmission, which leads to a completely uncontrolled unfolding process.

A cable consisting of threads provided with a binder envelope, e.g., glass threads, which are wound helically, has been known from DE 28 18 549 A1. The binder is used in such an amount that the length of the cable can be controlled under varying temperature conditions by causing a change in the cross-sectional area of the cable opposite the change in the length of the threads.

SUMMARY AND OBJECTS OF THE INVENTION

The primary object of the present invention is to provide a cable transmission of the type for moving panels provided with solar cells, which panels are folded on a spacecraft with hinges in an accordion-like manner, with cable pulleys at each hinge with which the movement processes of the individual solar panels of each extension arm of the spacecraft can be synchronized.

According to the invention, a transmission for moving panels is provided. The panels are provided with solar cells and are folded on a spacecraft with hinges in an accordion-like manner with cable pulleys at each hinge. The cable pulleys are connected to one panel rotating in unison with the panel and are rotatable with respect to an adjacent panel. Two adjacent cable pulleys are each wound around by an endless cable, which endless cable is connected to the pulleys rotating in unison with the pulleys. The cable is provided with a plastic sheathing firmly connected thereto outside the area of the cable pulleys to adapt its change in length during a temperature change to the change in the length of the panels and to increase its rigidity to elongation.

Consequently, at least one straight section, but preferably both straight sections of the endless cable between two cable pulleys, around which the cable is wound, is/are provided according to the present invention with a plastic sheathing, which is rigidly connected to the cable, e.g., by bonding. The cable sections that are placed around the cable pulleys and are fastened thereto are not covered with the plastic sheathing in order not to compromise the flexibility of the cable in this area.

The rigidity to elongation of the cable is increased substantially by the high rigidity of the plastic sheathing, as a result of which elongation of the cable by the strong tensile forces during the unfolding of the panels is counteracted. Since the change in the length of the cable that takes place according to the present invention is adapted by the plastic sheathing to the change in the length of the panels during an increase in temperature, the preset tension of the cable is essentially preserved. An extra synchronization of the unfolding process is thus guaranteed by the cable transmissions.

In addition, the change in the length of the cable during a reduction in the temperature corresponds according to the present invention to the change in the length of the panels. Thus, both the stressing of the hinges and panels and an increase in the frictional forces in the hinges due to strong tensile forces at low operating temperatures are counteracted.

At the same time, an uncontrolled springing of the panels in both directions during the unfolding process is prevented from occurring due to the high rigidity to elongation of the cables, which are provided with a plastic sheathing in their straight sections.

As usual, the cable may be a steel cable, especially one made of a stainless-steel alloy. The plastic with which the cable is sheathed may be an epoxy resin. The plastic sheathing is preferably reinforced with fibers. Carbon fibers or, e.g., Aramid fibers are used as the reinforcing fibers, especially for weight reasons. The panels and the yoke may consist, as usual, of a carbon fiber-reinforced plastic.

The coefficient of thermal expansion of the panels is, in general, between $-1 \times 10^{-6}$ and $+4 \times 10^{-6}$ 1/K, and the coefficient of thermal expansion of the steel cable is 14 to $17 \times 10^{-6}$ 1/K. The length of a panel and consequently of the straight section of the cable may be, e.g., between 1 and 4 m or more.

To achieve an adaptation of the change in the length of the cable to the change in the length of the panels during a change in temperature, a plastic with a coefficient of thermal expansion that approximately corresponds to that of the panels is used for the plastic sheathing. Since the thermal change in the length of the plastic-sheathed section of the steel cable depends on the cross section of the cable and the cross-sectional area of the plastic sheathing, the thermal change in length can also be set by varying the cross-sectional area of the plastic sheathing.

In addition, the thermal change in length, i.e., the change in length occurring during a change in temperature, depends on the orientation of the reinforcing fibers in the plastic sheathing, so that the angle of the reinforcing fibers in relation to the longitudinal axis of the cable represents another parameter for setting the change in the length of the cable as a function of the temperature.

The ratio of the sheathed cable length to the nonsheathed cable length is another parameter for setting the thermal change in the length of the cable.

The rigidity to elongation of the plastic-sheathed cable section depends on the modulus of elasticity, on the one hand, and the cross-sectional area of the plastic sheathing, on the other hand. The rigidity to elongation is also substantially affected by the reinforcing fibers. Thus, carbon fibers have a high rigidity to elongation at low density. Their coefficient of thermal expansion is also low. To allow the rigidity to elongation of the reinforcing fibers to exert its full effect, they are oriented essentially in parallel to the longitudinal axis of the cable.

To prepare the plastic sheathing, it is possible to apply, e.g., carbon fiber rovings impregnated with epoxy resin to the cable, preferably in the longitudinal direction, and to allow the epoxy resin to cure. A firm adhesive bond is established at the same time between the plastic sheathing and the cable during the curing of the epoxy resin. A protective sheathing for the carbon fiber rovings, which consists of fiber-reinforced plastic, may be applied in the same manufacturing step or in a separate manufacturing step.

The firm bond between the plastic sheathing and the cable is a prerequisite for the cable transmission according to the present invention. This bond is subjected to considerable stresses due to the high stress caused by the temperature variations during the operation.

The strength of the bond between the plastic sheathing and the cable can be increased by the plastic sheathing being tapered at its ends. As a result, the thermal expansion of the plastic sheathing in the area of the tapering adapts itself to the thermal expansion of the cable, as a consequence of which the forces acting between the cable and the plastic sheathing are reduced and destruction of the bond in the end areas of the sheathing is prevented from occurring with certainty.

The rigidity to elongation of the plastic-sheathed section of the cable is preferably more than double and especially at least four times that of the cable. Since, on the other hand, the cable shall have a certain, albeit slight spring action during the unfolding process, a rigidity to elongation equaling between 4 and 10 times that of the cable itself is preferred.

Even though it is conceivable to completely replace the straight sections of the cable with massive plastic rods, in which the cable sections wound around the cable pulleys are anchored, it is difficult to anchor the cable sections in the plastic rods, and the plastic sheathing of the cables according to the present invention does guarantee a redundancy of the endless cable against rupture of the individual elements in the straight area of the cable as well as against rupture of the plastic sheathing.

The present invention is further explained by the following exemplary embodiment:

EXAMPLE

The cable (known per se) of a transmission for unfolding solar panels is sheathed with an epoxy resin, in which carbon fibers are arranged in the longitudinal direction of the cable. The cable, consisting of stainless steel, has a diameter of 1.6 mm, and the sheathing has an external diameter of 5 mm. The coefficient of thermal expansion of the plastic-sheathed section of the cable was determined to be $0.4 \times 10^{-6}$ 1/K.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
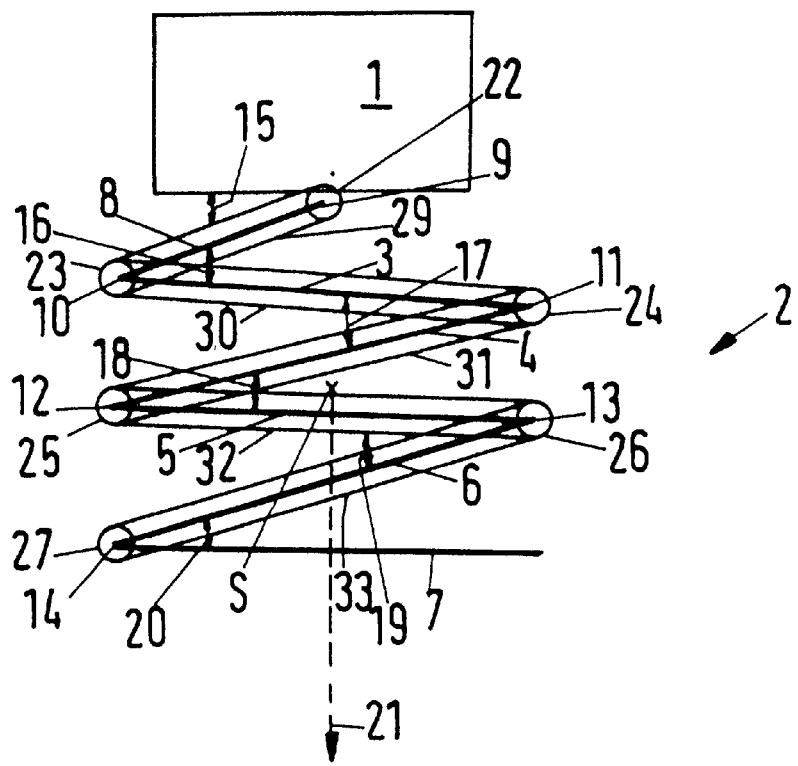
FIG. 1 is a top view of the solar cell extension arm of a spacecraft at the beginning of the unfolding process.

According to FIG. 1, a solar cell extension arm 2 is arranged, folded in an accordion-like manner, on a spacecraft, e.g., a satellite 1. The second solar cell extension arm, which has an identical design and is arranged on the opposite side of the satellite 1, is not shown in FIG. 1. Each of the two solar cell extension arms has, e.g., five panels 3 through 7, which form the support surface for the solar cells, not shown. The innermost panel 3 is connected via a hinge 10 to the so-called yoke 8, which is fastened to the satellite 1 via a hinge 9. The panels 3 through 7 are connected to one another by the hinges 11 through 14. The axes of the hinges 9 through 14 extend in parallel to one another. The hinges 12 and 13 between the panels 4, 5 and 6 are shown in greater detail in FIG. 2.

To unfold the solar cell extension arm 2, a drive, e.g., driving springs, is provided, with which the yoke 8 is moved away from the satellite 1, the panel 3 from the yoke 8, and the panels 4 through 7 are moved away from one another, as is indicated by the double arrows 15 through 19 in FIG. 1. To ensure that the center of gravity S of the extension arm 2 moves along the predetermined, straight path 21, a cable transmission is provided, which comprises upper cable pulleys 22 through 27 and lower cable pulleys at the hinges 9 through 14, wherein the cable pulleys 25' and 26' can be seen of the cable pulleys in FIG. 2. The upper and lower cable pulleys 22 through 27; 25', 26' are connected in pairs by cables 29 through 33. The endless cables 29 through 33 are wound around the corresponding pair of cable pulleys and are rigidly connected to the cable pulleys 25, 26 at the points 45, 46, as is shown in FIG. 2.

Figure 2:
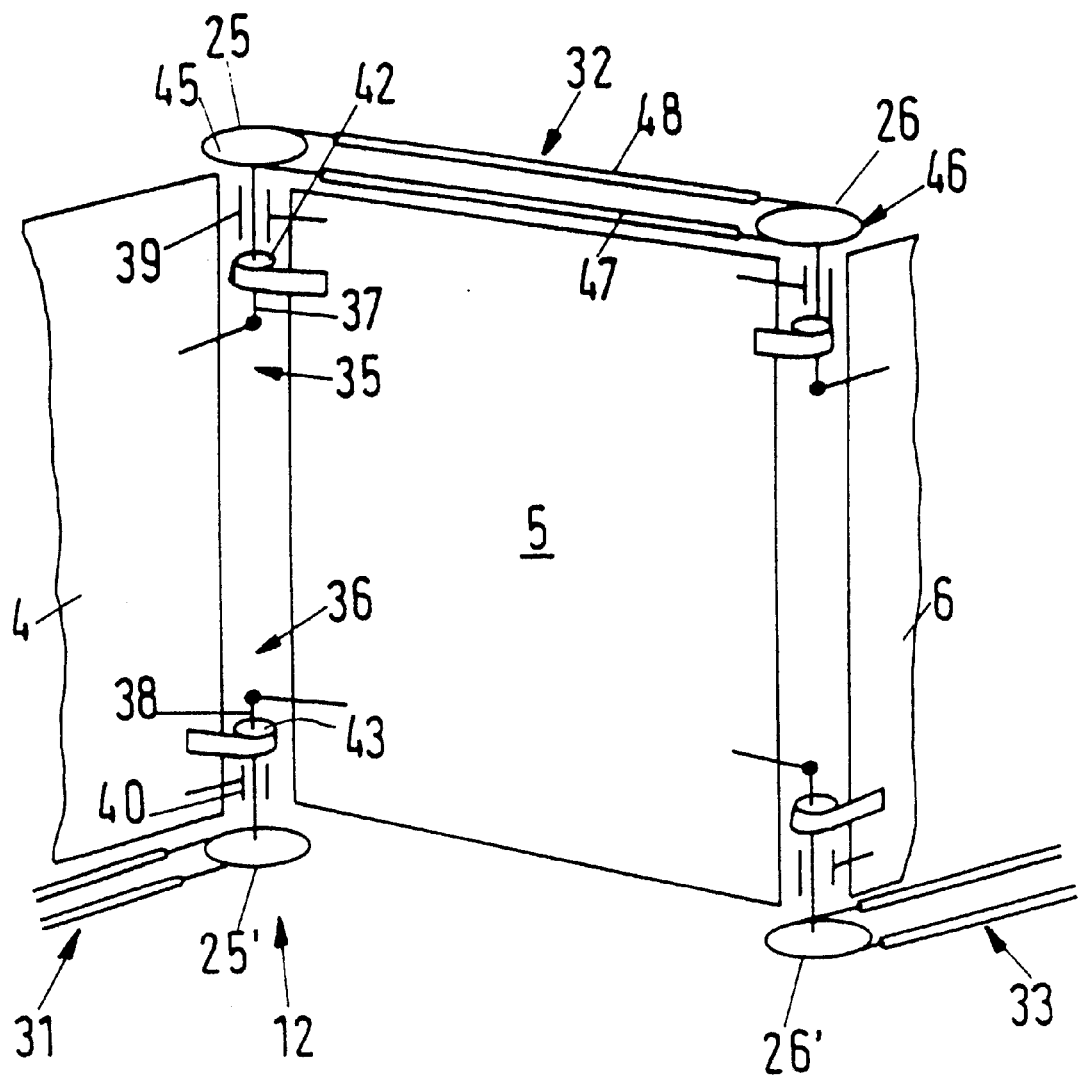
FIG. 2 is a side view of a section of the extension arm according to FIG. 1.

As is illustrated in FIG. 2 based on hinge 12, each hinge connection comprises two hinges 35, 36, with a respective axs 37, 38, which are mounted in a respective bearing 39, 40. The axis 37 of the hinge 35 is connected to the panel 4 rotating such as to rotate in unison with it, and the axis 38 of the hinge 36 is connected to the panel 5. The bearings 39, 40 are fastened to the respective panels 5 and 4.

Thus, e.g., of the two adjacent panels 4 and 5, which are connected to one another via the hinge 12, the upper cable pulley 25 is connected to the panel 4, rotatably in unison with it, and the lower cable pulley 25' is connected to the panel 5, rotating in unison with it.

The drive for folding out the panels 3 through 7, which is indicated by the arrows 15 through 19 in FIG. 1, may be formed, as is shown in FIG. 2, by driving springs 42, 43, which are fastened to the respective axis 37 and 38 of the respective hinges 35, 36, on the one hand, and to the respective panels 5 and 4, on the other hand. As is shown on the basis of cable 32 in FIG. 2, the straight sections of the endless cables are provided according to the present invention with a plastic sheathing 47, 48 outside the cable pulleys 25, 26. In order not to compromise the flexibility in the area of the cable pulleys 25, 26, the cable 32 may be provided with a plastic sheathing in some sections in the this area, which is not shown in the drawing.

Figure 3:
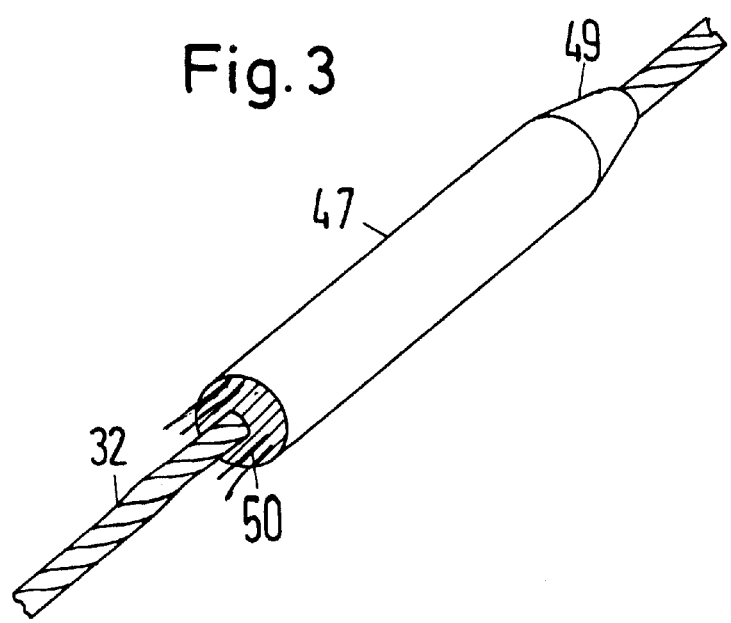
FIG. 3 is a perspective view of a section of the cable with the plastic sheathing partially cut away.

As is shown in FIG. 3, the plastic sheathing 47 is provided with reinforcing fibers 50, which extend predominantly in parallel to the longitudinal axis of the cable 32. The plastic sheathing 47 is conically tapered at its end 49. The other end of the plastic sheathing 47, which is not shown in FIG. 3, is tapered in the same manner.

The cable may consist of stainless steel, have a diameter of 1.6 mm, and the sheathing may have an external diameter of 5 mm. The coefficient of thermal expansion of the plastic-sheathed section of the cable was determined to be $0.4 \times 10^{-6}$ 1/K.

While a specific embodiment of the invention has been shown and described in detail to illustrate the application of the principles of the invention, it will be understood that the invention may be embodied otherwise without departing from such principles.

What is claimed is:

1. A transmission for moving panels, which are provided with solar cells and are folded on a spacecraft with hinges in an accordion-like manner, the transmission comprising:
   cable pulleys at each hinge, each cable pulley being connected to one panel, rotating in unison with the connected panel and rotatable with respect to an adjacent panel;
   endless cables, wherein two adjacent cable pulleys have an endless cable of said cables wound around for moving in unison with said two adjacent cable pulleys;
   a plastic sheathing firmly connected to said endless cable outside of an area of a first of said cable pulleys to adapt a change in length of said endless cable during a temperature change to the change in the length of the said panels and to increase a rigidity to elongation of said endless cable.

2. The transmission in accordance with claim 1, wherein said plastic sheathing is fiber-reinforced.

3. The transmission in accordance with claim 2, wherein said change in the length of said cable during a temperature change is adapted to the change in the length of said panels by the angle orientation of said reinforcing fibers in relation to the longitudinal axis of the cable.

4. The transmission in accordance with claim 2, wherein said rigidity to elongation of the cable sections provided with said plastic sheathing can be set by the angle of said reinforcing fibers in relation to the longitudinal axis of the cable.

5. The transmission in accordance with claim 2, wherein said reinforcing fibers are carbon fibers.

6. The transmission in accordance with claim 1, wherein said change in the length of said cable during a temperature change is adapted to the change in the length of the panels by the coefficient of thermal expansion and the cross-sectional area of said plastic sheathing.

7. The transmission in accordance with claim 1, wherein said rigidity to elongation of cable sections of said endless cable provided with said plastic sheathing can be set by the cross-sectional area and the modulus of elasticity of said plastic sheathing.

8. The transmission in accordance with claim 1, wherein said rigidity to elongation of the cable sections provided with said plastic sheathing is at least double the rigidity to elongation of the said cable.

9. The transmission in accordance with claim 1, wherein said plastic sheathing has a taper at its ends.

10. The transmission in accordance with claim 1, wherein said cable is covered with a plastic sheathing only in some sections in order not to compromise the flexibility in the area of said cable pulleys.

11. A spacecraft solar cell panel transmission arrangement, comprising:
   a first panel;
   a second panel;
   a first hinge connecting said first panel and said second panel for folding in an accordion-like manner;
   a second hinge connecting said second panel and said first panel for folding in an accordion-like manner;
   a first cable pulley at said first hinge connected to said first panel, rotating in unison with said first panel and rotatable with respect to said second panel;
   a second cable pulley at said second hinge connected to said second panel, rotating in unison with said second panel and rotatable with respect to said first panel;
   a first endless cable engaged with said first cable pulley moving in unison with said first cable pulley;
   a second endless cable engaged with said second cable pulley moving in unison with said second cable pulley;
   a first endless cable plastic sheathing findy connected to said first endless cable outside of a cable pulley engagement area of said first pulley to adapt a change in length of said first endless cable during a temperature change to the change in the length of said panels and to increase a rigidity to elongation of said first endless cable; and
   a second endless cable plastic sheathing fairly connected to said second endless cable outside of an a cable pulley engagement area of said second pulley to adapt a change in length of said first endless cable during a temperature change to the change in the length of said panels and to increase a rigidity to elongation of said second endless cable.

12. The transmission in accordance with claim 11, wherein said plastic sheathing is fiber-reinforced.

13. The transmission in accordance with claim 12, wherein said change in the length of said cable during a temperature change is adapted to the change in the length of said panels by the angle orientation of said reinforcing fibers in relation to the longitudinal axis of the cable.

14. The transmission in accordance with claim 11, wherein said rigidity to elongation of cable sections of said endless cable provided with said plastic sheathing can be set by selecting at least one of the cross-sectional area and the modulus of elasticity of said plastic sheathing and an angle of said reinforcing fibers in relation to the longitudinal axis of the cable, wherein said rigidity to elongation of the cable sections provided with said plastic sheathing is at least double the rigidity to elongation of the said cable.

15. The transmission in accordance with claim 11, wherein said plastic sheathing has a taper at its ends and said reinforcing fibers are carbon fibers.

16. The transmission in accordance with claim 11, wherein said rigidity to elongation of cable sections of said endless cable provided with said plastic sheathing can be set by selecting at least one of the cross-sectional area and the modulus of elasticity of said plastic sheathing and an angle of said reinforcing fibers in relation to the longitudinal axis of the cable, wherein said rigidity to elongation of the cable sections provided with said plastic sheathing is at least double the rigidity to elongation of the said cable.

17. A spacecraft solar cell panel transmission arrangement, comprising:

a first panel;

a second panel;

a third panel;

a first hinge connecting said first panel and said second panel for folding in an accordion-like manner;

a second hinge connecting said second panel and said third panel for folding in an accordion-like manner;

a first cable pulley at said first hinge connected to said first panel, rotating in unison with said first panel and rotatable with respect to said second panel;

a second cable pulley at said second hinge connected to said third panel, rotating in unison with said third panel and rotatable with respect to said second panel;

an endless cable wound around said first cable pulley and said second cable pulley moving in unison with said first cable pulley and second cable pulley, and a plastic sheathing by connected to said endless cable outside of a cable pulley engagement area of a said first cable pulley and outside of a cable pulley engagement area of said second cable pulley, said plastic sheathing to adapt a change in length of said endless cable during a temperature change to the change in the length of said panels and to increase a rigidity to elongation of said endless cable.

18. The transmission in accordance with claim 17, wherein said plastic sheathing is fiber-reinforced.

19. The transmission in accordance with claim 18, wherein said plastic sheathing has a taper at its ends and said reinforcing fibers are carbon fibers.

20. The transmission in accordance with claim 17, wherein said change in the length of said cable during a temperature change is adapted to the change in the length of said panels by the angle orientation of said reinforcing fibers in relation to the longitudinal axis of the cable.

* * * * *